(12) United States Patent
Zhang et al.

(10) Patent No.: US 12,452,111 B2
(45) Date of Patent: Oct. 21, 2025

(54) METHOD, APPARATUS AND COMMUNICATION SYSTEM FOR EVALUATING NONLINEAR COMPENSATION PERFORMANCE

(71) Applicant: FUJITSU LIMITED, Kawasaki (JP)

(72) Inventors: Ke Zhang, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 18/216,768

(22) Filed: Jun. 30, 2023

(65) Prior Publication Data

US 2024/0015054 A1 Jan. 11, 2024

(30) Foreign Application Priority Data

Jul. 11, 2022 (CN) .......................... 202210808020.6

(51) Int. Cl.
*H04L 23/02* (2006.01)
*H04L 25/03* (2006.01)
*H04L 25/49* (2006.01)

(52) U.S. Cl.
CPC ........ *H04L 25/03171* (2013.01); *H04L 25/49* (2013.01)

(58) Field of Classification Search
CPC .............. H04B 17/336; H04B 10/2543; H04B 10/2507; H04L 25/03; H04L 25/03171
USPC ......................... 375/262, 260, 267
See application file for complete search history.

(56) References Cited

U.S. PATENT DOCUMENTS

| 6,570,394 B1 | 5/2003 | Williams | |
| 10,235,993 B1 * | 3/2019 | Bradley | G10L 17/08 |
| 2023/0084994 A1 * | 3/2023 | Su | H04L 25/03834 |
| | | | 375/227 |
| 2023/0327759 A1 * | 10/2023 | Fan | H04B 10/07953 |
| | | | 398/26 |
| 2024/0283532 A1 * | 8/2024 | He | H04B 10/0775 |

FOREIGN PATENT DOCUMENTS

| CN | 103929212 A | 7/2014 |
| CN | 107276546 A | 10/2017 |

OTHER PUBLICATIONS

Tibault Reveyrand, et al., "Accurate characterization of intermodulation noise in multi carrier wide band power amplifiers based on a digital synthesis of pseudo noise stimuli", Annales Des Télécommunications vol. 61, 5-6, 2006.
Ricardo Figueiredo, et al. "Issues of Multi-Notch NPR Characterization Procedures", 2021 97th ARFTG Microwave Measurement Conference (ARFTG).

(Continued)

*Primary Examiner* — Khai Tran
(74) *Attorney, Agent, or Firm* — STAAS & HALSEY LLP

(57) ABSTRACT

A method, an apparatus and a communication system of evaluating a nonlinear compensation performance. The method for evaluating a nonlinear compensation performance comprises: evaluating a nonlinear compensation performance by using a probability-maintained notch signal as a test signal; the probability-maintained notch signal having a probability density function (PDF) that is maintained unchanged after notching as compared with before notching.

9 Claims, 5 Drawing Sheets

---

101 a nonlinear compensation performance is evaluated by using a probability-maintained notch signal as a test signal; the probability-maintained notch signal being a signal whose probability density function (PDF) after notching maintained unchanged compared with that before notching

(56) References Cited

OTHER PUBLICATIONS

Jian Hong Ke et al., "400 Gbit/s single-carrier and 1 Tbit/s three-carrier superchannel signals using dual polarization 16-QAM with look-up table correction and optical pulse shaping." Optics Express 22.1 (2014): 71-84.

Changsoo Eun et al., "A new Volterra predistorter based on the indirect learning architecture." IEEE transactions on signal processing 45.1 (1997): 223-227.

Ginni Khanna et al. "A memory polynomial based digital pre-distorter for high power transmitter components." Optical Fiber Communication Conference. Optical Society of America, 2017.

Vladislav Neskorniuk et al. "Neural-Network-Based Nonlinearity Equalizer for 128 GBaud Coherent Transcievers." Optical Fiber Communication Conference. Optical Society of America, 2021.

Manabu Arikawa et al., "Adaptive multi-layer filters incorporated with Volterra filters for impairment compensation including transmitter and receiver nonlinearity." Optics Express 29.18 (2021): 28366-28387.

Charles Nader et al. "Performance evaluation of peak-to-average power ratio reduction and digital pre-distortion for OFDM based systems." IEEE transactions on microwave theory and techniques vol. 59, No. 12, Dec. 2011, 3504-3511.

Junwen Zhang et al. "Memory-polynomial digital pre-distortion for linearity improvement of directly-modulated multi-IF-over-fiber LTE mobile fronthaul." 2016 Optical Fiber Communications Conference and Exhibition (OFC), OSA. IEEE, 2016.

P. W. Berenguer et al. "Nonlinear digital pre-distortion of transmitter components." 41st European Conference on Optical Communication (ECOC 2015). Institute of Electrical and Electronics Engineers, 2015.

* cited by examiner

FIG. 1
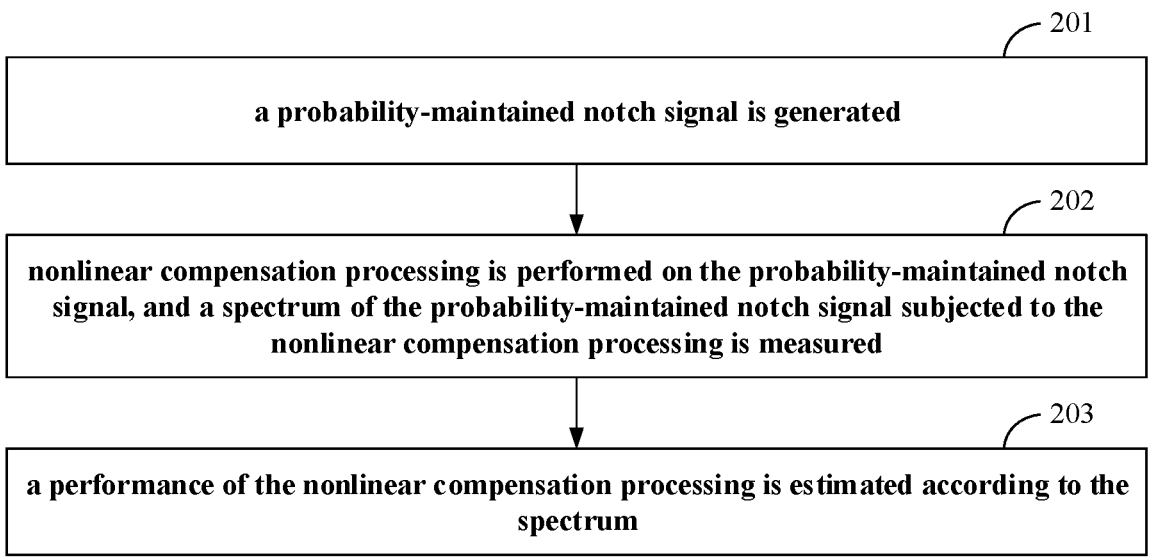
FIG. 2
FIG. 3
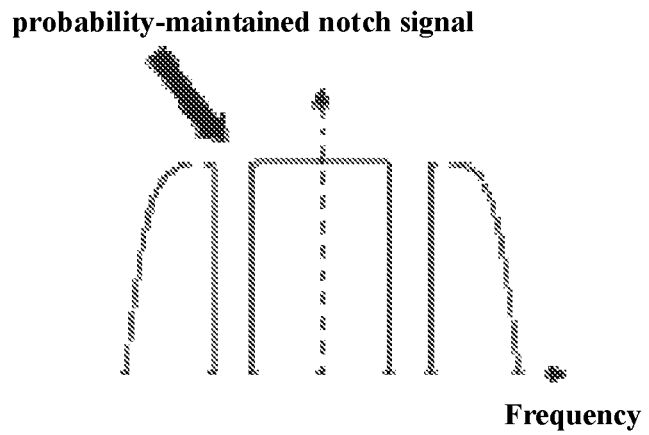

METHOD, APPARATUS AND COMMUNICATION SYSTEM FOR EVALUATING NONLINEAR COMPENSATION PERFORMANCE

CROSS-REFERENCE TO RELATED APPLICATIONS

This application is based on and hereby claims priority to Chinese Application No. 202210808020.6, filed Jul. 11, 2022, in the China National Intellectual Property Administration, the disclosure of which is incorporated herein by reference.

FIELD

The present disclosure relates to the field of communications, and particularly to a method, an apparatus and a communication system for evaluating a nonlinear compensation performance.

BACKGROUND

With the development of communication technologies, the influence of nonlinearity of a transceiver, especially a transmitter device, becomes increasingly important to the transmission performance of a communication system. For this reason, people have developed a variety of nonlinear compensation technologies to resist the influence of nonlinearity of the transceiver device.

Depending on locations, the nonlinear compensation technologies may be classified into two types: a digital pre-distortion (DPD) at a transmitter side and a nonlinear post-compensation at a receiver side.

For practical deployments, it is very important to select an optimal technical solution from a variety of nonlinear compensation methods and determine a most appropriate coefficient of pre-distorter or post-compensator, which relies on a convenient and accurate method for evaluating a nonlinear compensation performance.

A common and accurate evaluation method is a brute-force bit error rate (BER) analysis method, and similarly, an error vector magnitude (EVM) analysis method. Although the BER and the EVM can both accurately characterize the transmission performance of a communication system, while the measurement requires the assistance of a digital storage oscilloscope (DSO) and a receiver, which is inconvenient for practical implementation, especially for a digital pre-distortion performance evaluation. Moreover, the high-speed DSO is very expensive and not easy to obtain. In addition, the BER and the EVM are influenced by various factors, and it is impossible to directly judge whether the nonlinear compensation of the transceiver device works normally only from the BER or the EVM.

Another convenient evaluation method is to directly measure an adjacent channel power ratio (ACPR) or an out-of-band intermodulation distortion (IMD) power of a compensated signal in a frequency domain. The method is usually implemented based on an electrical spectrum analyzer (ESA) for a wireless communication system, and usually implemented based on an optical spectrum analyzer (OSA) for an optical communication system. However, although the method is very convenient, both the ACPR and the out-of-band IMD reflect an interference of a current channel on other channels due to the nonlinear effect, rather than establishing a reliable one-to-one correspondence with the BER of the current channel, so they cannot accurately evaluate the real performance of the nonlinear compensation technology. In addition, for a wideband signal, the ACPR and the out-of-band IMD are susceptible to bandwidth limitations of the transceiver and measuring equipment.

It should be noted that the above introduction to the technical background is only for the convenience of the clear and complete explanation of the technical solutions of the present disclosure and the understanding by those skilled in the art. It should not be considered that the above technical solutions are well known to those skilled in the art just because these solutions are described in the background section of the present disclosure.

SUMMARY

According to an embodiment of the present disclosure, there is provided an apparatus evaluating a nonlinear compensation performance, a memory; and a processor coupled to the memory to control execution of a process to: evaluate a nonlinear compensation performance by using a probability-maintained notch signal as a test signal; the probability-maintained notch signal having a probability density function that is maintained unchanged after notching as compared with before notching.

In some embodiments, the processor further controls execution of the process to: generate a probability-maintained notch signal; perform a nonlinear compensation processing on the probability-maintained notch signal, and measure a spectrum of the probability-maintained notch signal subjected to the nonlinear compensation processing; and estimate a performance of the nonlinear compensation processing according to the spectrum.

According to another aspect of the embodiments of the present disclosure, there is provided a method for evaluating a nonlinear compensation performance, wherein the method includes: evaluating a nonlinear compensation performance by using a probability-maintained notch signal as a test signal; the probability-maintained notch signal having a probability density function that is maintained unchanged after notching as compared with before notching.

In some embodiments, the method includes: generating a probability-maintained notch signal; performing nonlinear compensation processing on the probability-maintained notch signal, and measuring a spectrum of the probability-maintained notch signal subjected to the nonlinear compensation processing; and estimating a performance of the nonlinear compensation processing according to the spectrum.

According to still another aspect of the embodiments of the present disclosure, there is provided a communication system, wherein the communication system includes: a generator configured to generate a probability-maintained notch signal; a digital pre-distorter configured to perform digital pre-distortion processing on the generated probability-maintained notch signal; a transmitter configured to transmit the probability-maintained notch signal subjected to the digital pre-distortion processing; a spectrum analyzer configured to measure a spectrum of the probability-maintained notch signal subjected to the digital pre-distortion processing and passing through the transmitter; and a receiver configured to receive the probability-maintained notch signal transmitted by the transmitter.

According to yet another aspect of the embodiments of the present disclosure, there is provided a communication system, wherein the communication system includes: a generator configured to generate a probability-maintained notch signal; a transmitter configured to transmit the probability-maintained notch signal generated; a receiver configured to receive the probability-maintained notch signal; a compensator configured to perform nonlinear post-compensation processing on the received probability-maintained notch signal; and a calculator configured to calculate a spectrum of the probability-maintained notch signal subjected to the nonlinear post-compensation processing.

With reference to the following descriptions and drawings, the specific implementations of the present disclosure are disclosed in detail, and the ways in which the principle of the present disclosure can be adopted are pointed out. It should be understood that the implementations of the present disclosure are not limited thereby in scope. Within the scope of the clauses of the appended claims, the implementations of the present disclosure include many changes, modifications and equivalents.

The features described and/or illustrated for one implementation may be used in one or more other implementations in a same or similar way, and combined with or substituted for features in other implementations.

It should be emphasized that the term 'comprise/include' used herein refers to the presence of features, integers, operations (steps) or components, but does not exclude the presence or addition of one or more other features, integers, operations (steps) or components.

BRIEF DESCRIPTION OF THE DRAWINGS

The elements and features described in one drawing or implementation of the embodiments of the present disclosure may be combined with the elements and features illustrated in one or more other drawings or implementations. In addition, in the drawings, similar reference numerals indicate corresponding parts in several drawings, and can be used to indicate corresponding parts used in more than one implementation.

The drawings, which are included to provide a further understanding of the embodiments of the present disclosure, constitute a part of the specification, illustrate the implementations of the present disclosure, and explain the principle of the present disclosure together with the textual description. Obviously, the drawings described below only illustrate some embodiments of the present disclosure, and those of ordinary skill in the art can obtain any other drawing from them without paying any creative labor. In the drawings:

FIG. 1 illustrates a schematic diagram of a method for evaluating a nonlinear compensation performance according to an embodiment of the present disclosure;

FIG. 2 illustrates another schematic diagram of a method for evaluating a nonlinear compensation performance according to an embodiment of the present disclosure;

FIG. 3 illustrates a schematic diagram of a spectrum of a generated probability-maintained notch signal according to an embodiment of the present disclosure;

DETAILED DESCRIPTION

Figure 4:
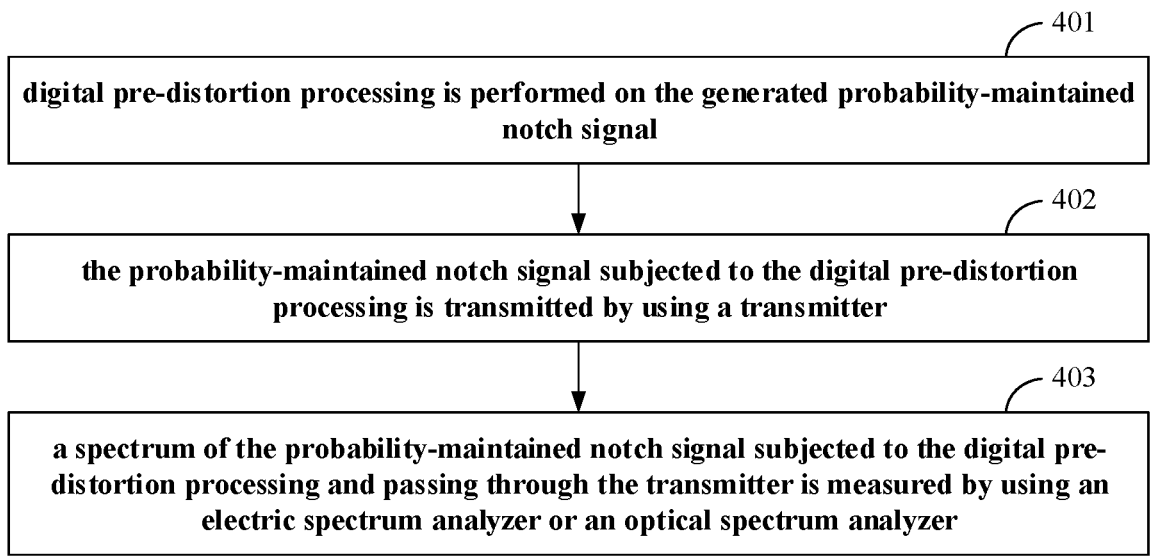
FIG. 4 illustrates a schematic diagram of an implementation of operation 202 of FIG. 2 according to an embodiment of the present disclosure.

The foregoing and other features of the present disclosure will become apparent from the following description with reference to the drawings. In the description and drawings, particular embodiments of the present disclosure are specifically disclosed to represent some embodiments in which the principle of the present disclosure can be adopted. It should be understood that the present disclosure is not limited to the described embodiments, and on the contrary, the present disclosure includes all modifications, variations and equivalents that fall within the scope of the appended claims.

In the embodiments of the present disclosure, the terms 'first', 'second', etc. are used to distinguish different elements in terms of titles, but they do not mean a spatial arrangement or a time sequence of these elements, and these elements should not be limited by them. The term 'and/or' includes any one and all combinations of one or more of terms listed in association. The terms 'comprise', 'include', 'have', etc. refer to the presence of the stated features, elements, members, or components, but do not exclude the presence or addition of one or more other features, elements, members or components.

In the embodiments of the present disclosure, singular forms 'a', 'the', etc. include plural forms thereof, and should be broadly understood as 'a kind of' or 'a category of' rather than being limited to the meaning of 'one'. In addition, the term 'said' should be understood to include both singular and plural forms, unless otherwise specified in the context explicitly. In addition, the term 'according to' should be understood as 'at least partially according to . . . ' and the term 'based on' should be understood as 'at least partially based on . . . ', unless otherwise specified in the context explicitly.

In view of the problems in existing systems, the embodiments of the present disclosure provide a method, an apparatus and a communication system for evaluating a nonlinear compensation performance, which can accurately estimate a nonlinear compensation performance.

For example, the method comprises: generating a probability-maintained notch signal; performing nonlinear compensation processing on the probability-maintained notch signal, and measuring a spectrum of the probability-maintained notch signal subjected to the nonlinear compensation processing; and estimating a performance of the nonlinear compensation processing according to the spectrum. By taking the probability-maintained notch signal as a test signal, it is possible to conveniently and accurately measure a residual in-band nonlinear distortion power spectrum of the signal subjected to the nonlinear compensation. The residual nonlinear distortion power spectrum can establish an exact one-to-one correspondence with the actual BER of a communication system, so as to accurately estimate the performance of the nonlinear compensation.

The embodiments of the present disclosure have at least the following advantageous effects: by taking the probability-maintained notch signal as a test signal, it is possible to conveniently and accurately measure a residual in-band nonlinear distortion power spectrum of the signal subjected to the nonlinear compensation. The residual nonlinear distortion power spectrum can establish an exact one-to-one correspondence with the actual BER of a communication system, so as to accurately estimate the performance of the nonlinear compensation.

Various embodiments of the embodiments of the present disclosure are described below with reference to the drawings.

Embodiments of a First Aspect

An embodiment of the present disclosure provides a method for evaluating a nonlinear compensation performance.

FIG. 1 illustrates a schematic diagram of a method for evaluating a nonlinear compensation performance according to an embodiment of the present disclosure. As illustrated in FIG. 1, the method includes:

101: a nonlinear compensation performance is evaluated by using a probability-maintained notch signal as a test signal; the probability-maintained notch signal being a signal whose probability density function (PDF) after notching maintained unchanged compared with that before notching.

According to the embodiment of the present disclosure, by taking the probability-maintained notch signal as a test signal, it is possible to conveniently and accurately measure a residual in-band nonlinear distortion power spectrum of the signal subjected to the nonlinear compensation. Since the residual nonlinear distortion power spectrum may establish an exact one-to-one correspondence with the actual BER of a communication system, it is possible to accurately estimate the performance of the nonlinear compensation.

FIG. 2 illustrates another schematic diagram of a method for evaluating a nonlinear compensation performance according to an embodiment of the present disclosure. As illustrated in FIG. 2 the method includes:

201: a probability-maintained notch signal is generated;
202: nonlinear compensation processing is performed on the probability-maintained notch signal, and a spectrum of the probability-maintained notch signal subjected to the nonlinear compensation processing is measured; and
203: a performance of the nonlinear compensation processing is estimated according to the spectrum.

It should be noted that FIG. 2 just schematically illustrates the embodiment of the present disclosure, and the present disclosure is not limited thereto. For example, the respective operations may be adjusted appropriately, some other steps may be added or some operations may be reduced. Those skilled in the art can make appropriate modifications according to the above content, rather than being limited to the illustration of FIG. 2.

In the embodiment of the present disclosure, by taking the probability-maintained notch signal as a test signal, it is possible to conveniently and directly measure a noise power ratio (NPR) corresponding to the residual in-band nonlinear distortion of the signal subjected to the nonlinear compensation, and obtain a complete in-band distortion power spectrum by changing a notch frequency of the test signal.

In which, 'notch' means that the power of the test signal at certain frequency is very low, and almost zero, so that the power of the signal measured by a spectrum analyzer at the frequency after nonlinear compensation is a residual nonlinear distortion after nonlinear compensation. In addition, the nonlinear effect and the nonlinear compensation effect are not only related to the nonlinear characteristic of the device itself and the specific compensation method, but also related to statistical characteristic of the input signal of the system. The actual communication system uses an unnotched signal, while a notched signal is used in measurement. The probability maintaining characteristic can keep the measured nonlinear effect and nonlinear compensation effect being consistent with the actual nonlinear effect and nonlinear compensation effect. The in-band distortion power spectrum may establish an accurate one-to-one correspondence with the BER which characterizes the performance of the communication system, thereby realizing accurate evaluation of the performance of a digital pre-distorter or a nonlinear post-compensator.

In the embodiment of the present disclosure, the generation method of the probability-maintained notch signal is not limited. For example, a corresponding probability-maintained notch signal may be generated according to the type of the signal transmitted by the actual communication system, the PDF of the probability-maintained notch signal is the same as or similar to that of the signal transmitted by the actual communication system, and the probability-maintained notch signal contains one or more notch bands. FIG. 3 illustrates a schematic diagram of a spectrum of a generated probability-maintained notch signal.

In the above embodiment, the actually transmitted signal may be replaced with a generated probability-maintained notch signal to estimate the performance of the nonlinear compensation.

For example, when the signal transmitted by the actual communication system is a PAM8 signal, a probability-maintained notch signal (PM-notch signal) is generated, which has a probability density function (PDF) the same as or similar to that of PAM8 but contains one or several notch bands in the frequency domain. The probability density function of an ideal PAM8 signal is eight $\delta$ functions. 'Similar' means replacing the $\delta$ function with a pulse function having a certain width, wherein a pulse width represents the degree of similarity and is a preset value determined according to the measurement accuracy requirement. Meanwhile, the spectrum of the PM-notch signal is substantially the same as that of the actually transmitted PAM8 signal except for at the notch band. When the signal transmitted by the actual communication system is a 64QAM signal or a probabilistic shaping (PS) 64QAM signal, the correspondingly generated PM-notch signal is the similar.

In the above embodiment, the center frequency and the bandwidth of the notch band of the probability-maintained notch signal are not limited, and can be reasonably selected according to the actual situation.

In an embodiment of the present disclosure, when the nonlinear compensation technology to be evaluated belongs to the digital pre-distortion, the operation 202 may be implemented by a method illustrated in FIG. 4. As illustrated in FIG. 4, the method includes:

401: digital pre-distortion processing is performed on the generated probability-maintained notch signal;

402: the probability-maintained notch signal subjected to the digital pre-distortion processing is transmitted by using a transmitter; and

403: a spectrum of the probability-maintained notch signal subjected to the digital pre-distortion processing and passing through the transmitter is measured by using an electric spectrum analyzer or an optical spectrum analyzer.

In 401, the digital pre-distortion processing to be evaluated may be performed on the probability-maintained notch signal.

The type of the digital pre-distortion is not limited in the present disclosure. For example, the digital pre-distortion may be based on an indirect learning (IDL) architecture or a direct learning (DL) architecture. A digital pre-distortion model may be a Volterra series; a simplified version of a Volterra series such as a memory polynomial, a Winner model or a Hammerstein model; or a look up table (LUT).

In addition, the signal sampling rate during implementation of the digital pre-distortion is also not limited in the present disclosure, that is, the digital pre-distortion to be evaluated may work in either a symbol domain or a waveform domain.

In 402, the probability-maintained notch signal subjected to the digital pre-distortion processing may be transmitted by using a transmitter.

In the embodiment of the present disclosure, the entire transmitter is an actual nonlinear system, and the nonlinear distortion is mainly caused by some of its internal components. For a wireless transmitter, the component is usually a power amplifier (PA); and for an optical transmitter, the components are typically a driver and a Mach-Zehnder modulator (MZM).

In 403, a spectrum of the PM-notch signal subjected to the digital pre-distortion processing and passing through the actual nonlinear system may be measured by using an electric spectrum analyzer or an optical spectrum analyzer, and then the performance of the digital pre-distortion processing may be estimated according to the spectrum.

In some embodiments, a noise power ratio NPR may be calculated according to the spectrum, and then the performance of the digital pre-distortion processing may be estimated according to the NPR. Optionally, the calculated NPR may also be corrected, and the performance of the digital pre-distortion processing may be estimated according to the corrected NPR. For example, a mean value of noise power ratios is calculated for the NPRs at different frequencies; and the performance of the nonlinear compensation processing is estimated according to the mean value.

In some embodiments, the probability-maintained notch signal contains one or more notch bands, and the noise power ratios at different frequencies are measured by performing nonlinear compensation processing on a plurality of the probability-maintained notch signals each containing only a small number of (e.g., one or two) notch bands with different center frequencies, or the noise power ratios at different frequencies are measured by performing nonlinear compensation processing on one probability-maintained notch signal (e.g., one probability-maintained notch signal containing a plurality of notch bands).

For example, when the generated PM-notch signal contains only a small number of (e.g., one or two) notch bands, it is possible to generate a plurality of PM-notch signals containing notch bands with different center frequencies, and repeat the process of FIG. 4 to obtain $NPR_r$ of the signal at different frequency within the passband by multiple measurements.

For another example, when the generated PM-notch signal contains a plurality of notch bands, it is possible to obtain $NPR_r$ of the signal at different frequencies within the passband by just one measurement.

$NPR_r$ of the signal at different frequencies within the passband, that is, the complete power spectrum of the residual in-band distortion, can be measured by either of the above two modes. The adopted mode is not specifically limited in the present disclosure and depends on the specific actual needs.

In the above embodiment, a notch depth of the generated PM-notch signal is limited and contains an interference component that may be described with the noise power ratio $NPR_t$. The interference component may also be captured by an electric spectrum analyzer or an optical spectrum analyzer, thereby causing interference to a measurement result of $NPR_r$. Therefore, in the embodiment of the present disclosure, the measurement result of $NPR_r$ may be corrected by using an equation:

$$NPR_m = 1/(1/NPR_r - 1/NPR_t)$$

Since the PM-notch signal is generated before the measurement, $NPR_t$ is known in the above equation. A mean noise power ratio $(NPR_m)$ corresponding to the residual in-band distortion may be obtained by calculating a mean value of $NPR_m$ at different frequencies. $(NPR_m)$ is in an exact one-to-one correspondence with the actual BER of the system, so that the performance of the current digital pre-distorter can be accurately estimated.

Figure 5:
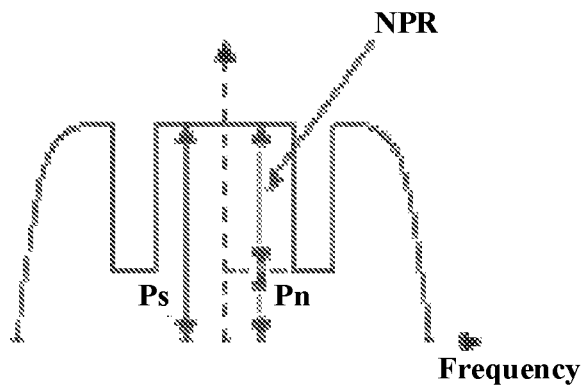
FIG. 5 illustrates a schematic diagram of a spectrum of a PM-notch signal subjected to digital pre-distortion processing and passing through an actual nonlinear system according to an embodiment of the present disclosure.

FIG. 5 illustrates a schematic diagram of a spectrum of a PM-notch signal subjected to digital pre-distortion processing and passing through an actual nonlinear system. As illustrated in FIG. 5, NPR is a ratio of a noise power Pn to a signal power Ps, i.e., NPR=Pn/Ps.

Figure 6:
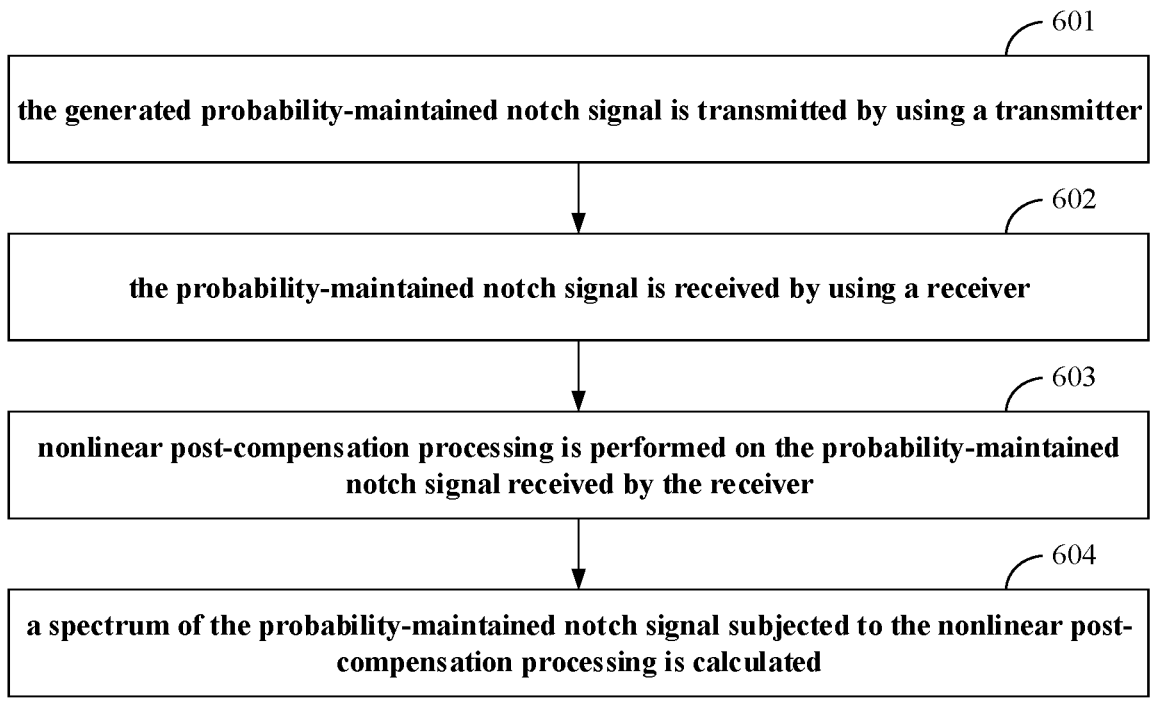
FIG. 6 illustrates a schematic diagram of another implementation of operation 202 in of FIG. 2 according to an embodiment of the present disclosure.

In the embodiment of the present disclosure, when the nonlinear compensation technology to be evaluated belongs to the nonlinear post-compensation, the above operation 202 may be implemented by a method illustrated in FIG. 6. As illustrated in FIG. 6, the method includes:

601: the generated probability-maintained notch signal is transmitted by using a transmitter;

602: the probability-maintained notch signal is received by using a receiver;

603: nonlinear post-compensation processing is performed on the probability-maintained notch signal received by the receiver; and

604: a spectrum of the probability-maintained notch signal subjected to the nonlinear post-compensation processing is calculated.

In 601, the generated probability-maintained notch signal may be transmitted by using a transmitter. The transmitter is a nonlinear system, and its nonlinear distortion is mainly caused by some of its internal components, which has been described in detail in 403, and the content thereof is incorporated herein and will not be repeated.

In 602, the probability-maintained notch signal transmitted from the transmitter may be received by using a receiver. The receiver is also a nonlinear system, and its main nonlinear source is a tran-impedance amplifier (TIA).

In 603, nonlinear post-compensation processing is performed on the received probability-maintained notch signal. The method for nonlinear post-compensation processing is also not limited in the present disclosure, and may be based on a nonlinear equalizer of a Volterra series, or based on a nonlinear equalizer of a neural network.

In 604, a spectrum of the signal subjected to the nonlinear post-compensation processing is calculated, and the performance of the nonlinear post-compensation processing may be estimated according to the spectrum.

Generally, the signal subjected to the nonlinear post-compensation processing has become discrete signal sample points, and it is possible to calculate the corresponding spectrum of the signal by directly performing a fast Fourier transform (FFT).

In the above embodiment, it is possible to obtain $NPR_r$ of the probability-maintained notch signal at different frequencies within the passband, that is, the complete power spectrum of the residual in-band distortion according to the calculated spectrum. Since the performance of the nonlinear compensation processing is measured or characterized by the NPR, it is possible to estimate the performance of the nonlinear post-compensation processing according to the noise power ratio.

In the above embodiment, the method for calculating the NPR and the method for correcting the calculated NPR are the same as those in the example of FIG. 4, and the content thereof is incorporated herein and will not be repeated.

It should be noted that FIGS. 4 and 6 just schematically illustrate the embodiments of the present disclosure, and the present disclosure is not limited thereto. For example, the respective operations may be adjusted appropriately, some other operations may be added or some operations may be reduced. Those skilled in the art can make appropriate modifications according to the above content, rather than being limited to the illustrations of FIGS. 4 and 6.

Those described above only exemplify the embodiments of the present disclosure, but the present disclosure is not limited thereto, and appropriate modifications can be made on the basis of the above embodiments. For example, the above embodiments may be used separately, or one or more thereof may be combined. For example, the digital pre-distortion processing and the nonlinear post-compensation processing may be performed simultaneously, thereby evaluating the common performance of pre-distortion and post-compensation.

According to the above method in the embodiments of the present disclosure, by taking the probability-maintained notch signal as a test signal, it is possible to conveniently and accurately measure a residual in-band nonlinear distortion power spectrum of the signal subjected to the digital pre-distortion processing and passing through the nonlinear system, or a residual in-band nonlinear distortion power spectrum of the signal output from the nonlinear system and subjected to the nonlinear post-compensation processing, or a residual in-band nonlinear distortion power spectrum of the signal subjected to both the digital pre-distortion processing and the nonlinear post-compensation processing. The power spectrum is in a one-to-one correspondence with the BER of the communication system, so that the performance of the nonlinear compensation can be accurately evaluated.

Embodiments of a Second Aspect

An embodiment of the present disclosure provides an apparatus for evaluating a nonlinear compensation performance, which evaluates a nonlinear compensation performance by using a probability-maintained notch signal as a test signal; and the probability-maintained notch signal is a signal whose probability density function after notching maintained unchanged compared with that before notching. Since the principle of this apparatus for solving problems is similar to that of the method according to the embodiments of the first aspect, its specific implementations may refer to those of the method according to the embodiments of the first aspect, and the same content will not be repeated.

Figure 7:
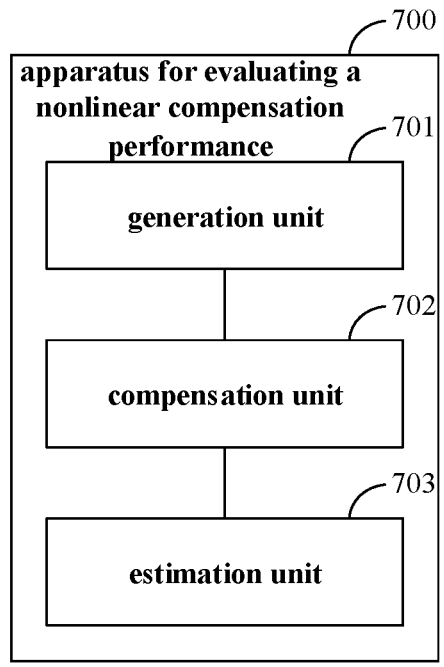
FIG. 7 illustrates a schematic diagram of an apparatus for evaluating a nonlinear compensation performance according to an embodiment of the present disclosure.

FIG. 7 illustrates a schematic diagram of an apparatus for evaluating a nonlinear compensation performance according to an embodiment of the present disclosure. As illustrated in FIG. 7, the apparatus 700 includes a generation unit 701, a compensation unit 702 and an estimation unit 703.

The generation unit 701 is configured to generate a probability-maintained notch signal; the compensation unit 702 is configured to perform nonlinear compensation processing on the probability-maintained notch signal, and measure a spectrum of the probability-maintained notch signal subjected to the nonlinear compensation processing; and the estimation unit 703 is configured to estimate a performance of the nonlinear compensation processing according to the spectrum.

In some embodiments, the generation unit 701 generates a corresponding probability-maintained notch signal according to a type of a signal transmitted by an actual communication system, a probability density function of the probability-maintained notch signal is the same as or similar to that of the signal transmitted by the actual communication system, and the probability-maintained notch signal contains one or more notch bands.

Figure 8:
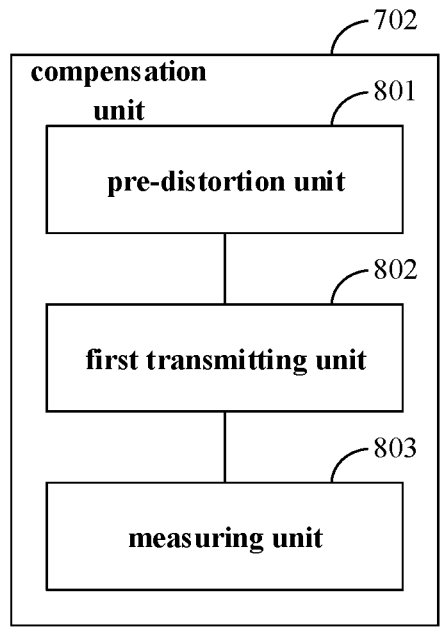
FIG. 8 illustrates a schematic diagram of an implementation of a compensation unit of the apparatus in FIG. 7 according to an embodiment of the present disclosure.

FIG. 8 illustrates a schematic diagram of an implementation of the compensation unit 702. As illustrated in FIG. 8, in some embodiments, the compensation unit 702 includes:

a pre-distortion unit 801 configured to perform digital pre-distortion processing on the generated probability-maintained notch signal;

a first transmitting unit 802 configured to transmit the probability-maintained notch signal subjected to the digital pre-distortion processing by using a transmitter; and a measuring unit 803 configured to measure a spectrum of the probability-maintained notch signal subjected to the digital pre-distortion processing and passing through the transmitter by using an electric spectrum analyzer or an optical spectrum analyzer.

Figure 9:
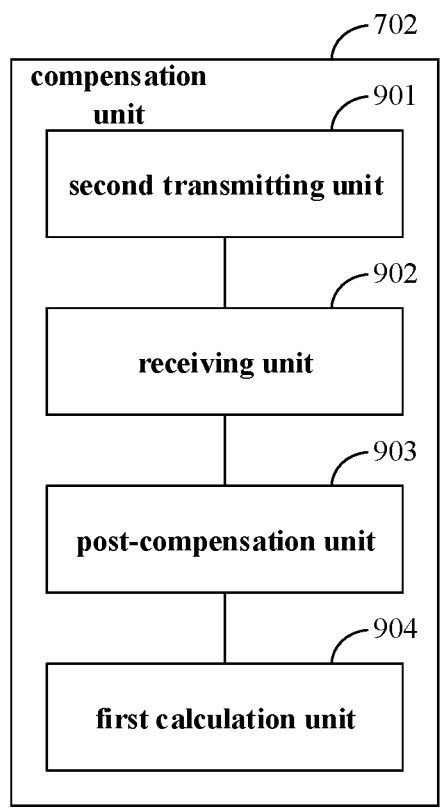
FIG. 9 illustrates a schematic diagram of another implementation of a compensation unit of the apparatus in FIG. 7 according to an embodiment of the present disclosure.

FIG. 9 illustrates a schematic diagram of another implementation of the compensation unit 702. As illustrated in FIG. 9, in some embodiments, the compensation unit 702 includes:

a second transmitting unit 901 configured to transmit the generated probability-maintained notch signal by using a transmitter;

a receiving unit 902 configured to receive the probability-maintained notch signal by using a receiver;

a post-compensation unit 903 configured to perform nonlinear post-compensation processing on the probability-maintained notch signal received by the receiver; and a first calculation unit 904 configured to calculate a spectrum of the probability-maintained notch signal subjected to the nonlinear post-compensation processing.

In some embodiments, the estimation unit 703 calculates a noise power ratio according to the spectrum, corrects the calculated noise power ratio, and estimates the performance of the nonlinear compensation processing according to the corrected noise power ratio.

In the above embodiments, the estimation unit 703 calculates a mean value of the noise power ratios at different frequencies, and estimates the performance of the nonlinear compensation processing according to the mean value.

In the above embodiments, the probability-maintained notch signal contains one or more notch bands, and the noise power ratios at different frequencies are measured by performing nonlinear compensation processing on a plurality of the probability-maintained notch signals each containing only one or two notch bands with different center frequencies, or the noise power ratios at different frequencies are measured by performing nonlinear compensation processing on one probability-maintained notch signal containing a plurality of different notch bands.

It should be noted that FIGS. 7 to 9 just schematically illustrate the embodiments of the present disclosure, and the present disclosure is not limited thereto. For example, the respective components may be adjusted appropriately, some other components may be added or some components may be reduced. Those skilled in the art can make appropriate modifications according to the above content, rather than being limited to the illustrations of FIGS. 7 to 9.

Those described above only exemplify the embodiments of the present disclosure, but the present disclosure is not limited thereto, and appropriate modifications can be made on the basis of the above embodiments. For example, the above embodiments may be used separately, or one or more thereof may be combined.

According to the above apparatus in the embodiments of the present disclosure, by taking the probability-maintained notch signal as a test signal, it is possible to conveniently and accurately measure a residual in-band nonlinear distortion power spectrum of the signal subjected to the digital pre-distortion processing and passing through the nonlinear system, or a residual in-band nonlinear distortion power spectrum of the signal output from the nonlinear system and subjected to the nonlinear post-compensation processing, or a residual in-band nonlinear distortion power spectrum of the signal subjected to both the digital pre-distortion processing and the nonlinear post-compensation processing. The power spectrum is in a one-to-one correspondence with the BER of the communication system, so that the performance of the nonlinear compensation can be accurately evaluated.

Embodiments of a Third Aspect

An embodiment of the present disclosure provides a communication system.

Figure 10:
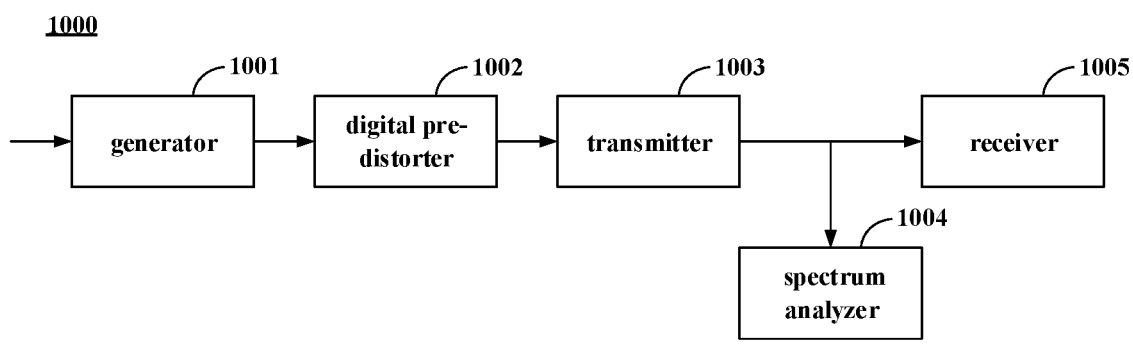
FIG. 10 illustrates a schematic diagram of a communication system according to an embodiment of the present disclosure.

FIG. 10 illustrates a schematic diagram of a communication system according to an embodiment of the present disclosure. As illustrated in FIG. 10, the communication system 1000 includes a generator 1001, a digital pre-distorter 1002, a transmitter 1003, a spectrum analyzer 1004, and a receiver 1005, wherein the generator 1001 is configured to generate a probability-maintained notch signal, and may be implemented through the operation 201 in FIG. 2; the digital pre-distorter 1002 is configured to perform digital pre-distortion processing on the generated probability-maintained notch signal, and may be implemented through the operation 401 in FIG. 4; the transmitter 1003 is configured to transmit the probability-maintained notch signal subjected to the digital pre-distortion processing, and may be implemented through the operation 402 in FIG. 4; the spectrum analyzer 1004 is configured to measure a spectrum of the probability-maintained notch signal subjected to the digital pre-distortion processing and passing through the transmitter; the spectrum analyzer 1004 may be an electric spectrum analyzer or an optical spectrum analyzer, which is not limited in the present disclosure, and may be implemented through the operation 403 in FIG. 4; the receiver 1005 is configured to receive the probability-maintained notch signal transmitted by the transmitter 1003. Please refer to the related art for the configuration and the implementation of the receiver 1005, and the description thereof is omitted here. In addition, since the operations 201 and 401 to 403 have been described in the embodiments of the first aspect, the content thereof is incorporated herein and will not be repeated.

In the above embodiment, the performance of the digital pre-distortion processing (nonlinear compensation processing) may be estimated according to the measured spectrum. Please refer to the operation 203 in the embodiments of the first aspect for the specific implementation, and the description thereof is omitted here.

Figure 11:
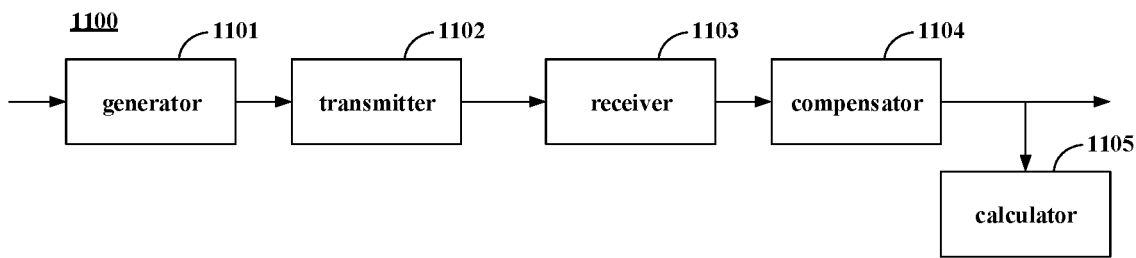
FIG. 11 illustrates another schematic diagram of a communication system according to an embodiment of the present disclosure.

FIG. 11 illustrates another schematic diagram of a communication system according to an embodiment of the present disclosure. As illustrated in FIG. 11, the communication system 1100 includes a generator 1101, a transmitter 1102, a receiver 1103, a compensator 1104, and a calculator 1105, wherein the generator 1101 is configured to generate a probability-maintained notch signal, which may be implemented through the operation 201 in FIG. 2; the transmitter 1102 is configured to transmit the generated probability-maintained notch signal, which may be implemented through the operation 601 in FIG. 6; the receiver 1103 is configured to receive the probability-maintained notch signal, which may be implemented through the operation 602 in FIG. 6; the compensator 1104 is configured to perform nonlinear post-compensation processing on the received probability-maintained notch signal, which may be implemented through the operation 603 in FIG. 6; and the calculator 1105 is configured to calculate a spectrum of the probability-maintained notch signal subjected to the nonlinear post-compensation processing, which may be implemented through the operation 604 in FIG. 6.

In the above embodiment, the performance of the nonlinear post-compensation processing (nonlinear compensation processing) may be estimated according to the calculated spectrum. Please refer to the operation 203 in the embodiments of the first aspect for the specific implementation, and the description thereof is omitted here.

FIGS. 10 and 11 only describe the composition and functions of the communication system related to the present disclosure, and the communication system may further include other components, which may be referred to in the related art, and the description is omitted here.

An embodiment of the present disclosure provides a computer-readable program, wherein when executed in an apparatus for evaluating a nonlinear compensation performance or a computer device, the program causes the apparatus for evaluating a nonlinear compensation performance or the computer device to perform the method according to the embodiments of the first aspect.

An embodiment of the present disclosure provides a storage medium in which a computer-readable program is stored, wherein the computer-readable program causes an apparatus for evaluating a nonlinear compensation performance or a computer device to perform the method according to the embodiments of the first aspect.

The above apparatus and method of the present disclosure can be implemented by hardware or a combination of hardware and software. The present disclosure relates to a computer-readable program which, when executed by a logic unit, enables the logic unit to implement the above apparatus or constituent parts, or enables the logic unit to implement the above methods or operations. The present disclosure also relates to a storage medium storing the above program, such as a hard disk, a magnetic disk, an optical disk, a DVD, a flash memory, etc.

The method/apparatus described in conjunction with the embodiments of the present disclosure may be directly embodied as hardware, a software module executed by a processor, or a combination thereof. For example, one or more of the functional block diagrams illustrated in the drawings and/or one or more combinations of the functional block diagrams may correspond to either respective software modules or respective hardware modules of a computer program flow. The software modules may respectively correspond to the operations illustrated in the drawings. The hardware modules for example may be implemented by solidifying the software modules with a field programmable gate array (FPGA).

The software module may be located in an RAM memory, a flash memory, an ROM memory, an EPROM memory, an EEPROM memory, a register, a hard disk, a removable disk, a CD-ROM or any other form of storage medium known in the art. A storage medium may be coupled to a processor, so that the processor can read information from and write information to the storage medium. Or, the storage medium may be a constituent part of the processor. The processor and the storage medium may be in an ASIC. The software module may be stored in a memory of a mobile terminal, or in a memory card insertable into the mobile terminal. For example, if a device (such as a mobile terminal) adopts a large-capacity MEGA-SIM card or a large-capacity flash memory device, the software module may be stored in the large-capacity MEGA-SIM card or the large-capacity flash memory device.

One or more of the functional blocks described in the drawings and/or one or more combinations of the functional blocks may be implemented as a general-purpose processor, a digital signal processor (DSP), an application specific integrated circuit (ASIC), a field programmable gate array (FPGA) or any other programmable logic device, discrete gates or transistor logic devices, discrete hardware components or any suitable combination thereof, for performing the functions described in the present disclosure. One or more of the functional blocks described in the drawings and/or one or more combinations of the functional blocks may further be realized as a combination of computing devices, such as a combination of a DSP and a microprocessor, a plurality of microprocessors, one or more microprocessors in communication with the DSP, or any other such configuration.

The present disclosure has been described above in conjunction with the specific implementations, but those skilled in the art should understand that these descriptions are exemplary rather than limiting the protection scope of the present disclosure. Those skilled in the art can make various variations and modifications to the present disclosure according to the principle of the present disclosure, and these variations and modifications should also fall within the scope of the present disclosure.

Regarding the implementations including the above embodiments, the following supplements are further disclosed:

In an example according to supplement 1, a method for evaluating a nonlinear compensation performance may comprise:
  evaluating a nonlinear compensation performance by using a probability-maintained notch signal as a test signal;
  the probability-maintained notch signal being a signal whose probability density function (PDF) after notching maintained unchanged compared with that before notching.

In an example, the method according to supplement 1, wherein the method comprises:
  S1: generating a probability-maintained notch signal;
  S2: performing nonlinear compensation processing on the probability-maintained notch signal, and measuring a spectrum of the probability-maintained notch signal subjected to the nonlinear compensation processing; and
  S3: estimating a performance of the nonlinear compensation processing according to the spectrum.

In an example, the method according to supplement 2, wherein S1 comprises:
  generating a corresponding probability-maintained notch signal according to a type of a signal transmitted by an actual communication system, a probability density function (PDF) of the probability-maintained notch signal is the same as or similar to that of the signal transmitted by the actual communication system, and the probability-maintained notch signal contains one or more notch bands.

In an example, the method according to supplement 2, wherein S2 comprises:
  S21: performing digital pre-distortion processing on the generated probability-maintained notch signal;
  S22: transmitting the probability-maintained notch signal subjected to the digital pre-distortion processing by using a transmitter; and
  S23: measuring a spectrum of the probability-maintained notch signal subjected to the digital pre-distortion processing and passing through the transmitter by using an electric spectrum analyzer or an optical spectrum analyzer.

In an example, the method according to supplement 2, wherein S2 comprises:
  S21': transmitting the generated probability-maintained notch signal by using a transmitter;
  S22': receiving the probability-maintained notch signal by using a receiver;
  S23': performing nonlinear post-compensation processing on the probability-maintained notch signal received by the receiver; and
  S24': calculating a spectrum of the probability-maintained notch signal subjected to the nonlinear post-compensation processing.

In an example, according to the method according to supplement 2, wherein S3 comprises:
  S31: calculating a noise power ratio (NPR) according to the spectrum;
  S33: estimating the performance of the nonlinear compensation processing according to the noise power ratio.

In an example, according to the method according to supplement 6, wherein S3 further comprises:
  S32: correcting the calculated noise power ratio NPR;
  in S33, the performance of the nonlinear compensation processing is estimated according to the corrected noise power ratio NPR.

In an example, according to the method according to supplement 6 or 7, wherein S33 comprises:
  calculating a mean value of noise power ratios for the NPRs at different frequencies; and
  estimating the performance of the nonlinear compensation processing according to the mean value.

In an example, according to the method according to supplement 8, wherein,
  the probability-maintained notch signal contains one or more notch bands, and the noise power ratios at different frequencies are measured by performing nonlinear compensation processing on a plurality of the probability-maintained notch signals each containing only one or two notch bands with different center frequencies, or the noise power ratios at different frequencies are measured by performing nonlinear compensation processing on one probability-maintained notch signal containing a plurality of different notch bands.

What is claimed is:

1. An apparatus for evaluating a nonlinear compensation performance, comprising:
a memory; and
a processor coupled to the memory to control execution of a process to:
evaluate a nonlinear compensation performance by using a probability-maintained notch signal as a test signal,
the probability-maintained notch signal having a probability density function that is maintained unchanged after notching as compared with before notching,
wherein, the processor further controls execution of the process to:
generate the probability-maintained notch signal;
perform a nonlinear compensation processing on the probability-maintained notch signal, and measure a spectrum of the probability-maintained notch signal subjected to the nonlinear compensation processing; and
estimate performance of the nonlinear compensation processing according to the spectrum.

2. The apparatus according to claim 1, wherein, the processor further controls execution of the process whereby:
the generating generates a corresponding probability-maintained notch signal according to a type of a signal transmitted by an actual communication system,
the probability density function of the probability-maintained notch signal is same as or similar to probability density function of the signal transmitted by the actual communication system, and the probability-maintained notch signal contains one or more notch bands.

3. The apparatus according to claim 1, wherein the processor further controls execution of the process to:
perform digital pre-distortion processing on the generated probability-maintained notch signal;
control a transmitter to transmit the probability-maintained notch signal subjected to the digital pre-distortion processing; and
measure a spectrum of the probability-maintained notch signal subjected to the digital pre-distortion processing and passing through the transmitter by using an electric spectrum analyzer or an optical spectrum analyzer.

4. The apparatus according to claim 1, wherein the processor further controls execution of the process to:
control a transmitter to transmit the generated probability-maintained notch signal;
control a receiver to receive the probability-maintained notch signal;
perform nonlinear post-compensation processing on the probability-maintained notch signal received by the receiver; and
calculate a spectrum of the probability-maintained notch signal subjected to the nonlinear post-compensation processing.

5. The apparatus according to claim 1, wherein, the processor further controls execution of the process to:
calculate a noise power ratio according to the spectrum, correct the calculated noise power ratio, and estimate the performance of the nonlinear compensation processing according to the corrected noise power ratio.

6. The apparatus according to claim 5, wherein, the processor further controls execution of the process to:
calculate a mean value of noise power ratios at different frequencies, and estimate the performance of the nonlinear compensation processing according to the mean value.

7. The apparatus according to claim 6, wherein,
the probability-maintained notch signal contains one or more notch bands, and noise power ratios at different frequencies are measured by performing nonlinear compensation processing on a plurality of the probability-maintained notch signals each containing only one or two notch bands with different center frequencies, or the noise power ratios at different frequencies are measured by performing nonlinear compensation processing on one probability-maintained notch signal containing a plurality of different notch bands.

8. A communication system, comprising:
a generator configured to generate a probability-maintained notch signal;
a digital pre-distorter configured to perform digital pre-distortion processing on the generated probability-maintained notch signal;
a transmitter configured to transmit the probability-maintained notch signal subjected to the digital pre-distortion processing;
a spectrum analyzer configured to measure a spectrum of the probability-maintained notch signal subjected to the digital pre-distortion processing and passing through the transmitter; and
a receiver configured to receive the probability-maintained notch signal transmitted by the transmitter.

9. A communication system, comprising:
a generator configured to generate a probability-maintained notch signal;
a transmitter configured to transmit the probability-maintained notch signal generated;
a receiver configured to receive the probability-maintained notch signal;
a compensator configured to perform nonlinear post-compensation processing on the received probability-maintained notch signal; and
a calculator configured to calculate a spectrum of the probability-maintained notch signal subjected to the nonlinear post-compensation processing.

* * * * *